Aug. 25, 1953 — P. D. HEATH — 2,650,350
ANGULAR MODULATING SYSTEM
Filed Nov. 4, 1948 — 2 Sheets-Sheet 1
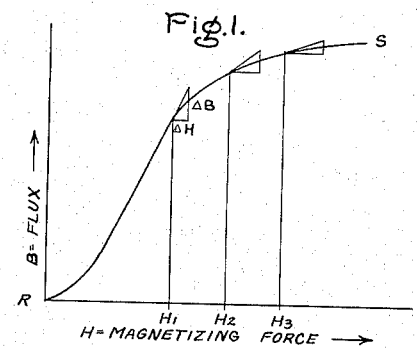
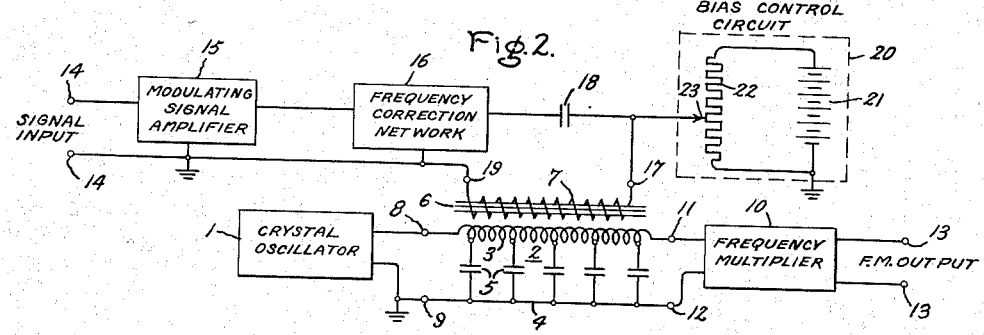
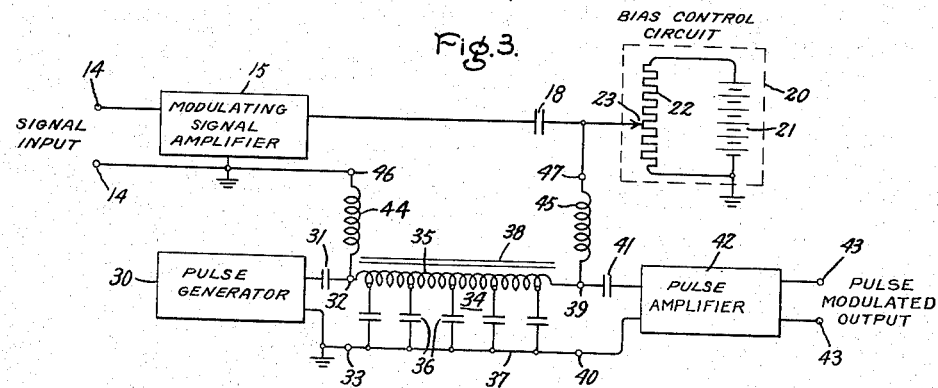
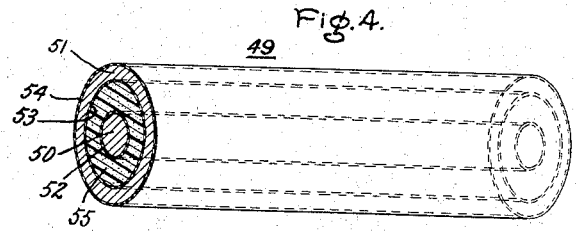
Inventor:
Paul D. Heath,
by His Attorney.

Aug. 25, 1953

P. D. HEATH 2,650,350

ANGULAR MODULATING SYSTEM

Filed Nov. 4, 1948

Inventor:
Paul D. Heath,
by *Merton O. Moore*
His Attorney.

Patented Aug. 25, 1953

2,650,350

UNITED STATES PATENT OFFICE 2,650,350

ANGULAR MODULATING SYSTEM

Paul D. Heath, Syracuse, N. Y., assignor to General Electric Company, a corporation of New York Application November 4, 1948, Serial No. 58,251

6 Claims. (Cl. 332—29)

This invention relates to angular modulation systems generally and more particularly to systems of this type wherein a modulation in frequency is caused by varying the phase of the output of a constant frequency oscillator.

An object of this invention is to provide a new and improved system for varying the phase of the current supplied from a master oscillator whose frequency remains fixed.

Another object of this invention is to provide a new and improved system for varying the time intervals between pulses in a pulsed transmitter in accordance with a modulating voltage.

A further object of this invention is to provide a new and improved system for generating a frequency modulated wave whose average frequency is controlled by a crystal oscillator, or other constant frequency generator.

Still a further object of this invention is to provide various artificial transmission lines and wave guides adapted to introduce a variable delay in a wave propagating therethrough.

In attaining these objects, I provide a constant frequency oscillator, and I interpose an artificial transmission line or wave guide between the oscillator and an output circuit. The line provides a phase delay between the generated voltage and the output voltage. Furthermore, I vary the amount of the phase delay by introducing into the magnetic circuit of the artificial line, a medium having a variable permeability. Then I provide an auxiliary circuit to control the permeability of this medium, thereby varying the phase delay to angularly modulate the output voltage. Through suitable correction networks, the modulating voltage may be altered to cause a linear phase modulation in the output, or a phase modulation equivalent to a direct frequency modulation.

For further objects and advantages and a better understanding of the invention, attention is now directed to the following description and accompanying drawings, and also to the appended claims in which the features of the invention believed to be novel are particularly pointed out.

In the drawings:

Fig. 1 is a diagram illustrating the relation between magnetizing force and flux density in soft iron for the purpose of illustrating the incremental permeability characteristics;

Fig. 2 is a simplified schematic diagram of a frequency modulated system embodying my invention;

Fig. 3 is a simplified schematic diagram of a pulse interval modulated system embodying my invention;

Fig. 4 is a perspective view of a section of coaxial line utilized in the system of Fig. 2;

Figure 5:
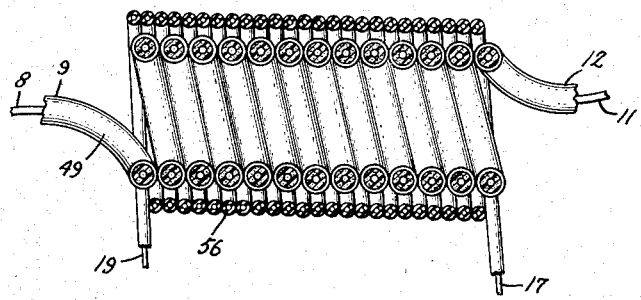
Fig. 5 is a cross-sectional view of an embodiment of a complete phase delay line including the coaxial line of Fig. 4 and suitable for use in the system of Fig. 2.

It is well known that an electric wave takes a finite time to travel through a transmission line. At high frequencies, a transmission line having an inductance of L henrys per unit length and a capacitance of C farads per unit length has a propagation constant:

$$\beta = \sqrt{LC} \text{ radians per unit length} \quad \text{(I)}$$

For a particular line of length M, a wave traveling through the line will be subjected to a total angular retardation:

$$\phi = M.\beta = M\sqrt{LC} \text{ radians} \quad \text{(II)}$$

From the above, it is apparent that the phase retardation can be varied by changing the factor L, that is, the inductance per unit length of the transmission line. In accordance with my invention, the inductance per unit length of a transmission line is varied by introducing into its magnetic circuit a medium, such as iron, whose incremental permeability varies in accordance with the magnetizing force applied to it.

Referring to Fig. 1, there is shown a curve RS, illustrating the relation between the flux B, and the magnetizing force H, for a typical sample of soft iron. The permeability of a medium is determined in accordance with the following relationship:

$$\mu = \frac{B}{H} \quad \text{(III)}$$

where $\mu$ = permeability
$H$ = magnetizing force
$B$ = flux

The inductance of any circuit, in which the flux paths are through a medium of a permeability $\mu$, varies as the rate of change of B with respect to H. If the permeability $\mu$ is not constant, that is, if B does not vary linearly with H, the effective $\mu$ is not, in general, the ratio $B/H$, but is the ratio of a small change in B to a small change in H at the operating point, that is, at the actual magnetic intensity H about which the small change occurs. This ratio is termed the incremental permeability and is given by the following relation:

$$\mu_i = \frac{\Delta B}{\Delta H} \qquad (IV)$$

where $\mu_i$=incremental permeability. This is illustrated in Fig. 1 for three values of magnetizing force $H_1$, $H_2$, and $H_3$. It is seen that the incremental permeability is equal to the slope of the permeability curve or, in other words, to the first derivative of B as a function of H.

It is possible to select a magnetic medium such that the incremental permeability or, in other words, the first derivative of the permeability curve, varies substantially as the square of the magnetizing force over a certain operating range. Such a curve, for instance, is illustrated by curve RS of Fig. 1 over the range $H_1$ to $H_3$. By applying a constant magnetizing force sufficient to locate the incremental permeability at the point $H_2$ in the center of the range $H_1$ to $H_3$ of the permeability curve, and thereafter superimposing on this magnetizing force a component proportional to a modulating signal, the incremental permeability will vary proportionally to the square of the modulating signal. By incorporating such a magnetic medium in the magnetic circuit of a transmission line or wave guide, the inductance of the transmission line or wave guide may be varied in accordance with the square of the amplitude of a modulating signal. Since the phase delay is proportional to the square root of the inductance, the phase delay will thus be directly proportional to the modulating signal over the operating range $H_1$ to $H_3$ of Fig. 1.

Referring to Fig. 2, there is shown a system for producing a frequency modulated output from a crystal oscillator in accordance with my invention. The component circuits, represented in block form, may be of any types commonly known to the art and, accordingly, are not shown in detail. A crystal oscillator 1 is connected to an artificial transmission line 2 which comprises a continuous distributed inductance 3 and a conductor 4, across which a number of shunting capacitances 5 are evenly distributed. The distributed inductance 3 has a laminated soft iron core 6 disposed along its length so that it forms part of its magnetic circuit, and a winding 7 is provided about the core to apply a magnetizing force to it. The input of the delay line is connected to the crystal oscillator at points 8 and 9, and its output is connected to a frequency multiplier 10 at points 11 and 12. The output from the frequency multiplier is available as a frequency modulated wave at output terminals 13. The multiplier 10 is not necessary except to multiply the frequency swing of the output.

A pair of input signal terminals 14 are adapted to supply, from a source not shown in the drawing, an audio or other signal to a modulating signal amplifier 15. The function of this amplifier is to increase the amplitude of the modulating signal and supply it to a frequency correction network 16. When a phase modulated signal is used to obtain a frequency modulated wave in which the frequency deviation is proportional to the amplitude of a modulating signal, it is necessary to make the phase deviation of the wave inversely proportional to the frequency, and directly proportional to the amplitude, of the modulating signal. As is well-known to the art, this can be done by passing the modulating signal through a filter having an output inversely proportional to the frequency of the input. The simplest type of filter available for this purpose, consists of a series resistance shunted by a capacitance of comparatively low reactance over the operating range of frequencies. The magnitude of the output is then inversely proportional to the frequency of the input or, in other words, the attenuation is directly proportional to frequency and increases at the rate of six decibels per octave. The purpose of the frequency correction network is to provide to the modulating signal an attenuation which increases linearly with frequency in accordance with these requirements.

The output of the frequency correction network 16 is supplied through a capacitance 18 to the terminal 17 of the winding 7, of which the other terminal 19 is grounded. A bias control circuit 20, comprising a grounded battery 21, connected to a potentiometer 22 having a tap 23, which is directly connected to the terminal 17 of the winding 7, provides a unidirectional magnetizing current through that winding. This magnetizing current determines the operating point on the permeability curve of the core 6. For instance, the unidirectional current may locate the operating point at a point such as $H_2$ on curve RS of Fig. 1. The purpose of the capacitance 18 is to block the unidirectional current from the bias control circuit 20 and to prevent it from flowing to the frequency correction network 16, while allowing the modulating signal from the frequency correction network to flow to the winding 7 of the artificial delay line 2. The modulating signal then varies the magnetizing force on the core 6 through a range, such as that bounded by the limits $H_1$ and $H_3$ of Fig. 1. The result is a variation in the phase delay in the output of the crystal oscillator through the artificial line 2. Through the effect of the frequency correction network 16, this phase delay produces an equivalent frequency modulation proportional to the modulating signal. The frequency swing is then multiplied to any desired extent by the frequency multiplier 10 and the frequency modulated output wave is available at the terminals 13.

Referring to Fig. 3, there is shown another embodiment of my invention in a pulse interval modulating system. A constant interval pulse generator 30 supplies a pulse voltage, through a capacitance 31, to the input points 32 and 33 of a phase delay line 34. The phase delay line comprises a distributed inductance 35, distributed shunt capacitances 36, a parallel conductor 37, and a core 38 composed of a magnetic substance such as powdered iron in a resin binder. The output terminals 39 and 40 of the delay line are connected through a capacitance 41 to a pulse amplifier 42, which in turn provides an output at a pair of output terminals 43. A pair of inductances 44 and 45 are connected to the points 32 and 39, respectively. The terminal 46 of inductance 44 is grounded, while terminal 47 of inductance 45 is connected into a circuit similar to that of the modulating circuit of Fig. 2. This circuit comprises a pair of signal input terminals 14, a modulating signal amplifier 15, a coupling capacitor 18 and a bias control circuit 20. The frequency correction network 16 of Fig. 2 is eliminated from this embodiment, and the modulating signal amplifier 15 is directly connected to the coupling capacitor 18.

In this embodiment, the magnetizing current flows in the same winding as the pulse current, and inductances 44 and 45 are selected to have a high impedance through the range of frequencies of the pulses. These inductances allow a unidirectional biasing current and the comparatively low frequency modulating signal currents to flow freely through the distributed inductance 35. On the other hand, they prevent the pulses from flowing into the signal modulating circuit, while capacitances 31 and 41 prevent the signal modulating current from flowing into the pulse generator 50 or into the pulse amplifier 61.

In operation, a constant unidirectional biasing current flows through the distributed inductance 35 of the line 34 and magnetizes the core 38, thus locating the operating point on the permeability curve of the core at a point such as $H_2$ in Fig. 1. The modulating signal currents vary the magnetizing force applied to the core through a range such as that from $H_1$ to $H_3$. This causes a variation in the incremental permeability of the core, and changes the inductance of the line and the phase delay of a wave propagating therethrough. The pulses from the pulse generator accordingly are subject to a greater or lesser delay depending upon the modulating signal. The pulses arriving at the output terminals 43 are thus modulated as to pulse rate in accordance with the signals supplied to the input terminals 14.

The modulating signal, in addition to varying the phase delay through the line, also varies its characteristic impedance. This may cause reflections at the output terminals of the line. Where these reflections become greater than can be tolerated, they may be eliminated by terminating the delay line by a variable impedance in the form of an electronic valve modulated by the same modulating signal as is used to vary the incremental permeability of the line, or by a suitable variable resistance device.

Referring to Fig. 4, which is a perspective view of a section of the coaxial line utilized in the phase delay line 2 of Fig. 2, there is shown a section of a line 49 comprising an inner conductor 50 and an outer conductor 51. The inner conductor is covered by an insulating wrapper 52 and the inside and outside of the outer conductor are respectively covered by an insulating binder 53 and by an insulating wrapper 54. The space between the insulating coverings is filled by a low hysteresis magnetic material 55 such as, for instance, a dense suspension of powdered Permalloy in a suitable flexible nonconducting plastic binder.

Referring to Fig. 5, there is shown a cross-sectional view of an embodiment of a delay line, making use of the coaxial line of Fig. 4, which is suitable for use as the line 2 in the system of Fig. 2. The delay line comprises a number of turns of the coaxial line 49 wound to form a continuous helical coil. Around the helically coiled coaxial line, a single conductor 56 is wound in a continuous, closely spaced helix. In operation, this device is connected in a circuit such as that of Fig. 2, and the terminals 8, 9, 11, and 12 correspond to the terminals of the delay line 2 shown therein and bearing the same reference numerals. Similarly, terminals 17 and 19 of the helix formed by conductor 56 correspond to the terminals of the magnetizing winding 7. The purpose of the helix is to magnetize the magnetic material in the core of the coaxial line and thereby control its incremental permeability and the delay suffered by a wave propagating through it.

Figure 6:
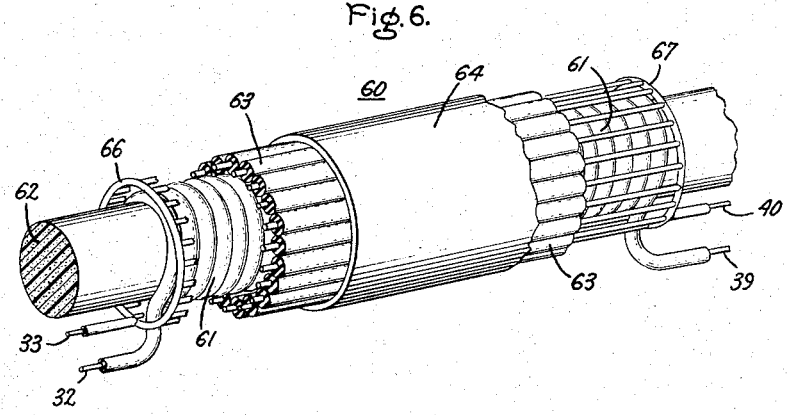
Fig. 6 is a perspective view of an embodiment of a phase delay line suitable for use in the system of Fig. 3.

Referring to Fig. 6, there is shown another construction of a delay line particularly suitable for use in the system of Fig. 3. The artificial transmission line 60 comprises an insulated conductor 61, formed into a helical coil of closely wound turns, supported on a substantially cylindrical powdered iron core 62, and surrounded by a layer of insulated conductors 63, the conductors 63 being enclosed by a suitable wrapping 64.

The conductor 61 preferably is a solid copper wire covered with a suitable insulating material such as enamel. The conductors 63 may be constructed and insulated in the same manner as conductor 61, or may be formed as a braid or sheath of insulated conductors. The conductors 63 are insulated from each other throughout their length and are connected together by soldered connections to rings 66 and 67 at their ends to form a grounded conductor for the transmission line.

The terminals 32 and 39 of the inner conductor constituting the helical coil, and the terminals 33 and 40 of the outer conductor, provide equivalent terminals to those shown in Fig. 3 bearing the same reference numerals, when this line is used in the modulating system described therein.

Figure 7:
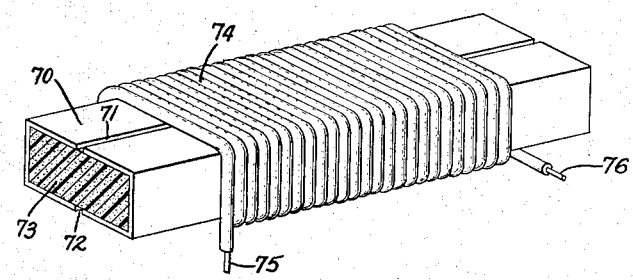
Fig. 7 is a perspective view of an embodiment of a phase delay wave guide.

Referring to Fig. 7, there is shown a perspective view of a wave guide adapted to produce a variable phase delay in a wave propagating therethrough. A rectangular wave guide 70 is shown split longitudinally along the center of the upper and lower surfaces at 71 and 72. The interior of the wave guide is filled with a suitable nonconducting magnetic material 73 having a variable permeability, such as finely powdered iron in a resin binder. A winding 74 is helically wound around the outside of the wave guide and provides a pair of terminals 75 and 76.

In operation, signal voltages are applied to terminals 75 and 76 to cause a longitudinal magnetization of the magnetic material 73 in the wave guide. The purpose of the longitudinal slotting of the wave guide is to prevent the formation of a short circuited inductor by the outer periphery of the wave guide in the field of the magnetizing winding 74. The location of the slots is such as not to interfere with the currents in the walls of the wave guide when a wave is propagating therethrough in the well-known $TE_{0,1}$ mode. The carrier wave on which the signals are to be superimposed as a frequency or phase modulation are supplied in any of the well known ways to the end faces of the guide. The variation in the magnetization applied to the magnetic material causes a variation in its incremental permeability and results in a variation of the phase delay suffered by a wave propagating through the guide.

Certain novel features of the variable delay structures of Figs. 4–7 are specifically claimed in my copending application Serial No. 138,623, filed January 14, 1950, now abandoned, which is a division of the present application.

While certain specific embodiments have been shown and described, it will, of course, be understood that various modifications may be made without departing from the invention. The appended claims are, therefore, intended to cover any modifications which are within the true spirit and scope of the invention.

What I claim as new and desire to secure by Letters Patent of the United States is:

1. An angular modulating system comprising a constant frequency oscillator, a pair of output terminals, an artificial transmission line consisting of substantially non-dissipative elements connected between said oscillator and said terminals, a substance having a variable permeability located in the magnetic field of said transmission line, a magnetizing winding surrounding said substance, a source of modulating signal, and means to supply a current from said source to said winding to vary the magnetization of said substance in accordance with said modulating signal.

2. A phase modulating system for producing an alternating voltage having a phase deviation with respect to a reference phase which varies substantially linearly with the amplitude of a modulating signal, comprising an oscillator providing a voltage at a substantially constant frequency, a pair of output terminals, an artificial transmission line connected between said oscillator and said terminals to produce, in currents flowing between said oscillator and said terminals, a phase delay substantially proportional to the square root of the inductance of said line per unit length, a magnetic substance located in the magnetic field of said line, said substance having an incremental permeability substantially proportional to the square of the applied magnetizing force over a predetermined range, said substance causing the inductance per unit length of said line to vary substantially proportionally to said incremental permeability, a source of modulating signal, and means for varying the magnetic force applied to said substance proportionally to the amplitude of said modulating signal within said range, whereby said phase delay is substantially proportional to the amplitude of said modulating signal.

3. A frequency modulating system for producing an alternating voltage having a frequency deviation with respect to a reference frequency which varies substantially linearly with the amplitude of a modulating signal comprising an oscillator providing a voltage at a constant frequency, a pair of output terminals, an artificial transmission line connected between said oscillator and said terminals to produce, in currents flowing between said oscillator and said terminals, a phase delay substantially proportional to the square root of the inductance of said line per unit length, a magnetic substance located in the magnetic field of said line, said substance having an incremental permeability substantially proportional to the square of the applied magnetizing force over a predetermined range, said substance causing the inductance per unit length of said line to vary substantially proportionally to said incremental permeability, a source of modulating signal, means for varying the amplitude of said modulating signal as a linear inverse function of its frequency, and means for varying the magnetic force applied to said substance proportionally to the amplitude of said modulating signal within said range, whereby said phase delay is substantially proportional to the amplitude and inversely proportional to the frequency of said modulating signal and said frequency deviation is substantially proportional to the amplitude only of said modulating signal.

4. A phase modulating system for producing an alternating voltage having a phase deviation with respect to a reference phase which varies linearly with the amplitude of modulating signals, comprising an oscillator providing an alternating voltage at a constant frequency, a source of modulating signal currents, a pair of output terminals, an artificial transmission line connected between said oscillator and said terminals, said line producing at said terminals a phase delay in the output voltage substantially proportional to the square root of the inductance of said line per unit length, a magnetic substance located in the magnetic field of said line, a magnetizing winding in proximity to said substance having an incremental permeability which varies substantially as the square of current in said winding over a predetermined current range, said substance causing the inductance per unit length of said line to vary substantially proportionately to said incremental permeability, means for causing a predetermined unidirectional bias current to flow through said winding to magnetize said substance, said bias current having an intermediate value within said range, and means for superimposing said modulating signal currents upon said bias current to produce current variations within said range substantially proportional to the amplitude of said modulating signals.

5. A frequency modulating system for producing an alternating voltage having a frequency deviation with respect to a reference frequency which varies linearly with the amplitude of a modulating signal, comprising an oscillator providing an alternating voltage at a constant frequency, a source of modulating signal currents, a pair of output terminals, an artificial transmission line connected between said oscillator and said terminals to produce in currents flowing between said oscillator and said terminals a phase delay substantially proportional to the square root of the inductance of said line per unit length, a magnetic substance located in the magnetic field of said line, a magnetizing winding in proximity to said substance, said substance having an incremental permeability which varies substantially as the square of current in said winding over a predetermined current range, said substance causing the inductance per unit length of said line to vary substantially proportionally to said incremental permeability, an attenuator for decreasing the amplitude of said modulating signal by six decibels for every octave increase in frequency, a winding in proximity to said magnetic substance, means for causing a predetermined unidirectional bias current to flow through said winding to magnetize said substance, said bias current having an intermediate value within said range, and means for superimposing said modulating signal currents upon said bias current to produce current variations within said range substantially proportional to the amplitude of said modulating signal after attenuation by said attenuator.

6. A pulse interval modulating system for producing pulses whose time deviations from a constant time interval between pulses are substantially proportional to the amplitude of a modulating signal, comprising an oscillator producing pulses recurring at said constant time interval, a source of modulating signal, a pair of output terminals, an artificial transmission line consisting of substantially non-dissipative elements connected between said oscillator and said terminals, said line producing at said output terminals a delay in said pulses substantially porportional to the square root of the inductance of said line per unit length, a magnetic substance located in the magnetic field of said line, said substance having an incremental permeability substantially proportional to square of the applied magnetizing force over a predetermined range, said substance causing the inductance per unit length of said line to vary substantially proportionally to said incremental permeability, means for varying the magnetic force applied to said substance proportionally to the amplitude of a modulating signal, whereby said phase delay is substantially proportional to the amplitude of said modulating signal.

PAUL D. HEATH.

References Cited in the file of this patent

UNITED STATES PATENTS

| Number | Name | Date |
| --- | --- | --- |
| 2,279,441 | Buchmann et al. | Apr. 14, 1942 |
| 2,382,615 | Donley | Aug. 14, 1945 |
| 2,423,085 | DeRosa | July 1, 1947 |
| 2,438,119 | Fox | Mar. 23, 1948 |
| 2,486,843 | Hepp | Nov. 1, 1949 |
| 2,565,231 | Hepp | Aug. 21, 1951 |